United States Patent Office 3,621,580
Patented Nov. 23, 1971

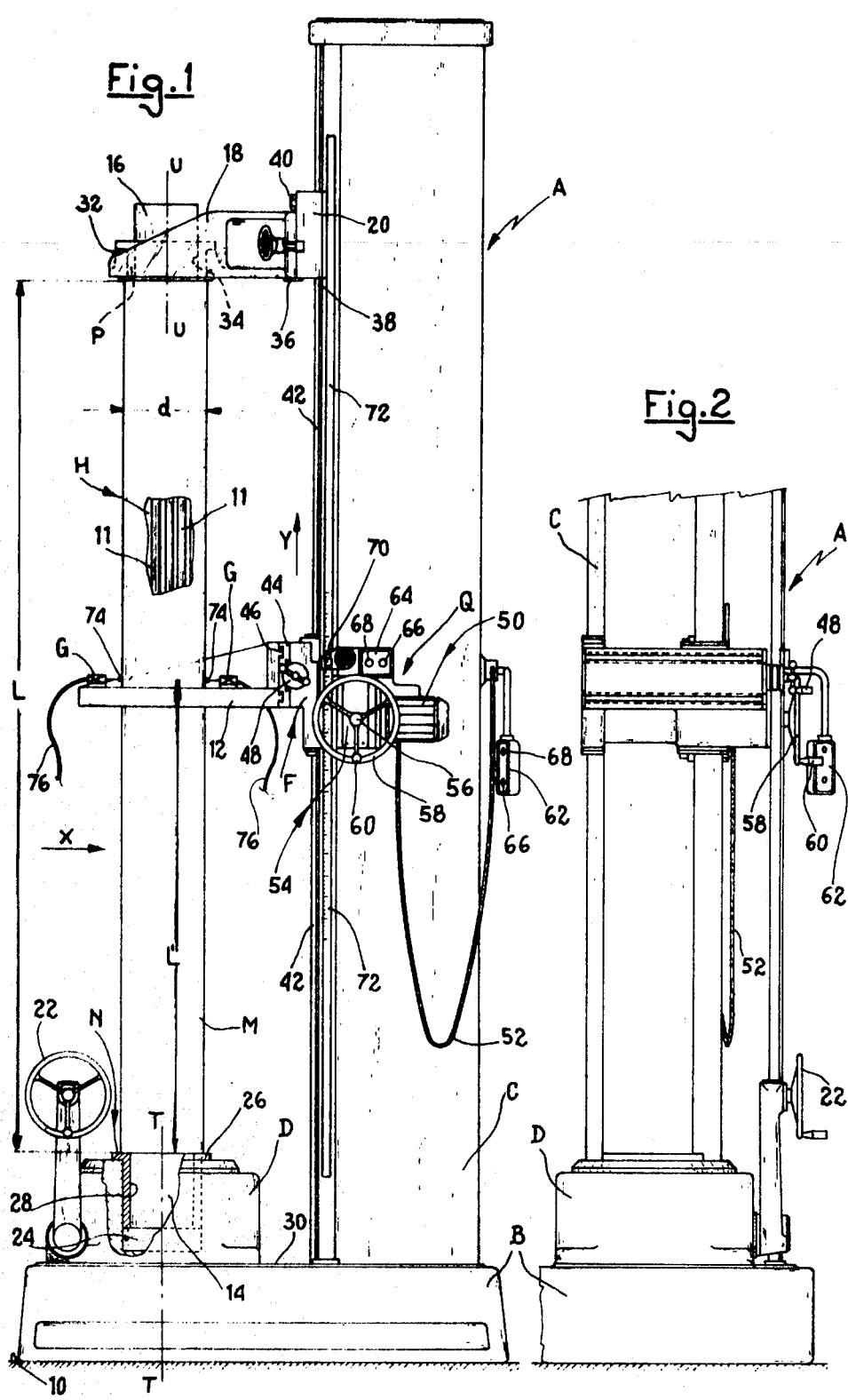

3,621,580
MACHINE FOR THE DIMENSIONAL CONTROL OF ELEMENTS FOR NUCLEAR FUELS
Gian Luigi Tovaglieri, Busto Arsizio, Varese, Italy, assignor to Tovaglieri & C. S.p.A., Busto Arsizio, Varese, Italy
Filed Jan. 15, 1968, Ser. No. 697,720
Claims priority, application Italy, Oct. 4, 1967, 21,253/67
Int. Cl. G01b 5/04
U.S. Cl. 33—174
10 Claims

ABSTRACT OF THE DISCLOSURE

A machine for the dimensional control of nuclear fuel elements, comprising a base plate and a vertical column carrying respectively a bottom and a top seat to which the element to be inspected can be secured with its axis strictly parallel to the column axis. Along said vertical column a slide can be moved upwardly and downwardly, in order to permit inspection by feeler means on the outer surface of the nuclear element.

BACKGROUND

This invention concerns a machine for the dimensional control of nuclear fuel elements.

Nuclear fuel elements are already known, consisting of a plurality of radioactive fuel rods, arranged in suitable seats and contained in a sheath by which the whole element is delimited. Said sheath is usually an elongated form and comprises noses formed on the ends thereof for securing and joining the fuel element in the related power pile or other plant.

The cross-section of said sheath may be circular or polygonal with a broken perimeter, whereby in the former case a cylindrical element is obtained, while in the latter case a parallelepiped element is obtained.

It is also known that the sheath of the nuclear fuel element is to be submitted to very accurate dimensional controls, wherefrom it must result that the machining allowances have been kept within the required tolerances.

Said dimensional controls are presently made in a wholly empirical manner, since an inspection fixture, having substantially the outer sizes of the sheath, is usually utilized. The sheath is then passed through said inspection fixture, for control notwithstanding the presence of manufacturing defects therein. Thus, if the sheath outer surface is over-dimensioned, said sheath will pass with difficulty or not at all, through the inspection fixture, while should same outer surface be under-dimensioned, the spaces left between said sheath outer surface and the fixture inner surface are to be measured with a thickness gauge.

Thus, as it can be readily appreciated, the above usually utilized procedure is not only time-consuming but is also far from being sufficiently accurate.

SUMMARY

The above and further drawbacks are obviated by this invention, that concerns a machine for the dimensional control of nuclear fuel elements, which comprises: a base with a related platform, that is formed with a seat for supporting the lower end or nose of a nuclear element; a column, vertically extending from said base and fitted with guide tracks for a slide carrying a frame or the like, wherein feeler means are fitted for controlling the outer surface of nuclear element sheath, said vertical guide tracks being strictly parallel to the vertical axis of said supporting seat; as well as to a second seat for supporting the upper end or nose of nuclear element, and that can be adjusted along the column in the position corresponding to the length of nuclear element which is to be controlled, the axis of said second seat being accurately aligned with the axis of said first seat, and thus also strictly parallel to said vertical guides whereby when the nuclear element, and the related sheath, are placed with their noses into said supporting seats for the dimensional control thereof, a perfect parallelism of both element ends to slide tracks is positively ensured. The slide is then conveniently moved along their guide tracks, whereby the sheath outer surface is inspected and controlled by the feelers, which reveal the rectilinearity, co-axiality and/or symmetry conditions, and consequently also the machining defects to be corrected. The design of the machine above described allows a simple and ready setting of the element to be controlled, and permits the whole sheath surface to be accurately examined.

The device is provided with axially spaced annular supports in each of which is seated the two opposite nuclear element noses, said annular seats being precisely bored to correspond with the diameter of the noses, the bores being coaxial and their common axis being parallel to the slides along which move the feelers.

The platform with the related bottom supporting seat may be of the stationary or rotary type, according to the type of nuclear element, provided with either a circular or a polygonal cross-sectional shape.

At least one micrometrically graduated scale is fitted to the vertical column, parallel to guide track of the slide, wherein the feeler means are supported. A suitable reading means is moved, together with the slide, along said scale, thereby to indicate at any moment the level attained by the slide, and thus the level attained by feeler means, and consequently also the position of sheath cross-section which is being inspected at that moment by said feeler means.

The slide carrying the feeler means for the sheath is movable in either direction along the guide track, by means of a geared motor secured to same slide, the geared motor shaft being fitted with a pinion, that is in mesh with a vertical rack, fastened in the column; the sense of pinion rotation and thus the upward or downward motion of slide, as well as the amount of slide translation, are determined by the current pulses that are sent to the geared motor, through a switch controlled by the operator.

The machine is advantageously equipped with two switches, one of which is stationary with respect to the vertical column, while the other one is secured to geared motor and thus follows this latter in its translation motion along the column.

According to a preferred embodiment of the invention, the slide and their feeler means can be micrometrically adjusted in the required position on the sheath to be inspected, by means of a device, controlled by a manually operated adjusting handwheel, which allows, with the geared motor switched-off, the geared motor and the slide to be moved within predetermined limits, e.g. in the range of 20–50 mm. along the column.

The above and further objects and advantages of the invention will be better appreciated from the following description, in conjunction with the accompanying drawings, which description and drawings refer to a preferred embodiment of the present invention.

BRIEF DESCRIPTION OF THE DRAWINGS

FIG. 1 is a side view of a machine according to the invention which, in the case in question, is of the revolving platform type, for the control of cylindrical sheath of nuclear fuel elements.

FIG. 2 is a front view of same machine of FIG. 1, as seen in the direction of arrow X.

DETAILED DESCRIPTION OF THE INVENTION

Referring now to the drawings, A is the machine for the dimensional control of nuclear fuel elements, which comprises a base bed B resting on floor 10, a column C, having a suitable height and extending vertically from said base bed, and a platform D, that in the present case is of the rotary type but which could be also stationary as stated before. Slidingly fitted along said column C and movable in the direction of arrow Y and also in the opposite direction is the slide F, carrying a frame 12 whereon the feeler means G are fitted, the feeler means being movable along the whole nuclear element H in order to inspect the whole outer surface of sheath M and to establish whether or not the sheath is within the required machining tolerances, or whether or not it shows rectilinearity or co-axiality faults. The element H, and thus the sheath M, is placed on the machine in such a manner that its bottom nose 14 can be inserted into the related bottom seat N of platform D, while the top nose 16 is inserted into the seat P, as formed in a tilting rest 18 that can be fastened, by means of its base 20, at the required height on the column C, according to the length of nuclear element H, as stated in more detail later.

The platform D can be rotated around its own axis T—T by means of the manually operated handwheel 22, by which, through a suitable back gear, a pinion can be brought in mesh with, or out of mesh with a gear (not shown) secured to the platform.

The platform D has a suitably dimensioned centrally arranged recess 24, wherein the bottom seat N, for supporting the nose 14, is accommodated, the dimensions of said seat established as being a function of the nose size, i.e. more or less larger according to sizes of element H.

Said seat N, is in the form of a ferrule having a ledge crown 26, and is formed with a calibrated vertical bore 28, wherein the related nose 14 is seated, the axis of said bore 28 being strictly vertical (and thus perpendicular to base plane 30) and coincident with said vertical axis T—T.

Fitted opposite of the bottom supporting seat N, is the top seat P, that is inserted into a suitable recess of the crown 32, extending from the tilting rest 18. Said seat P consists, like the seat N, of a ferrule having sizes corresponding to that of the top nose 16 and formed with a vertical, calibrated bore 34 wherein said nose 16 is seated, and the axis U—U of which is strictly vertical and aligned with the axis T—T of bore 28.

The rest 18 can be tilted upwardly around a hinge 36, to allow for the passage of the crane hook by which the element H is conveyed and placed onto the machine. As stated before, the tilting rest 18 is hinged to the base 20 which is slidingly fitted to guide tracks 38, whereby it can be moved therealong, in order to bring the seat P to the height corresponding to the position of top nose 16 which is to be seated therein. 40 is a set screw, by which the base 20 can be locked in the selected position.

The slide F is slidingly supported along the tracks 42, fitted to vertical column C, which tracks 42 are strictly vertical and parallel to axes T—T and U—U of calibrated bores 28 and 34 of seats N and P on the column C. Fitted on the side of slide F that is directed toward the nuclear element H to be inspected is a table 44, having prismatic guides 46 wherein the frame 12 is retained. The table 44 and the frame 12 are horizontally adjustable by means of handwheel 48, and a geared motor Q, fastened to opposite side of said slide F, which geared motor Q allows, when switched in, movement of the slide F both in the direction of arrow Y and in the opposite direction.

The geared motor Q consists of an electric motor 50 (to which current is fed through the flexible lead 52), and of a reduction gear 54 that is coupled therewith in such a manner that the driven shaft of reduction gear is operated at the required r.p.m. Keyed on latter shaft is a pinion, that is in mesh with a vertical rack fitted inside of column C, whereby when the pinion is turned by the motor in either directions the geared motor is moved upwards or downwards thereby driving the slide and the related frame 12 in the same directions along the guides 42.

The slide is moved along their guides at a speed which may conveniently range from 3000 up to 3300 mm. per minute.

For micrometrically adjusting the slide, the gears of the reduction unit cooperate with a manually operated device, having a handwheel 58 with a crank 60, keyed on its shaft 56. By means of said handwheel, after having switched the motor 50 off, the slide may be moved by small amounts in either directions.

The electric pulses by which the motor 50 is operated and thus moved along with the slide F, are sent thereto by the operation of stationary switch 62, or of the switch 64 that is fitted on the geared motor and thus is moved therewith. Both the switch 62, to which the lead 52 is connected, and the switch 64 comprise two pushbuttons 66, 68 which can be depressed by the operator in order to have the slide F moved upwards or downwards along the guides 42. Obviously, either the switch 62 or the switch 64 can be utilized by the operator according to the convenience or to the position of geared motor Q.

Fast with the geared motor Q, and thus to the slide F, is an enlarging eyepiece lens 70, which lens is moved close to the micrometrically graduated scale 72 located vertically and parallel to the guide 42, whereon the millimeter indications related to length of element M to be inspected can be read. Obviously, when the slide F is stopped in a given position on the guides 42, such position will correspond to a given cross-section of sheath M, which is identified by the reading on the scale 72, made through the lens of eyepiece 70.

As already stated, fitted on the frame 12 and secured to slide F are the feelers G, having movable rods which ends 74 are continuously kept in contact with the related portions of sheath M.

Such feelers may be of any suitable type, e.g. pneumatic or electronic type, and connected with writing recorders. Thus, each feeler G is connected with a lead 76, leading either to an indicating instrument (e.g. of the dial type) or to a recording device. While in the first case no permanent indication of data transmitted from the feelers G is obtained, in the latter case said data are permanently recorded on the recording tape which will show the diagrams of motions performed by the ends 74 and thus of the shape of inspected portions of sheath M.

In the case of a cyindrical sheath only three feelers, located at 120 degs. from each other, or four feelers located at 90 degs. from each other, are fitted on frame 12; however when a parallelepipedon shaped sheath having a plurality of sides is to be inspected, a number of feelers for each sheath side is required depending on the number of sides of polygonal cross-section of the sheath. Obviously, in the latter case, the assembly requiring a greater number of feelers, along with the related instruments or recorders, will be more complicated and expensive.

The operation and performances of machine can be summarized as follows:

Let us assume that a dimensional control is to be performed on an element H which, as well known, consists of a plurality of radioactive fuel rods 11 arranged in suitable seats and enclosed within the sheath M (which in this case is cylindrically shaped) that represents the outer delimitation of element H and which weight may attain one half of a ton or more.

Said nuclear element H has, in our case, a length L and a diameter $d$ of the sheath, which is to be inspected to ascertain whether the machining allowances have been kept within the tolerances as required by the final use of said element H. Thus, the rectilinearity and co-axiality of sheath M shall be controlled at each point of its length L on the machine A.

The element H is conveyed by a crane to the machine, the crane hook being engaged with the upper end of said element which is placed with its bottom nose 14 into the calibrated bore 28 of seat N having a size corresponding to that of the size of nose 14. While the element is being placed in the machine, the rest 18 is kept tilted upwardly to allow for the passage of crane hook. Then the hook is disengaged from the upper end of element H, the rest is tilted downward, thereby engaging the nose 16 into the calibrated bore 34 of seat P.

By such a positioning, a highly accurate parallelism of either ends of element H to sliding tracks 42 of slide F is ensured, said ends necessarily being aligned vertically with one another, because of the accurate alignment of bores 28 and 34.

Should such vertically adjustable parallel arrangement not be provided, then in the case of elements H having a smaller length L—it would be impossible to have the ends 14 and 16 engaged into their supporting seats.

After the element H has been properly seated into the machine, the switch 62 or 64 is actuated by the operator, whereby the geared motor Q and the slide F, which is assumed to be now in its downward end-stroke position, will begin to move vertically in the direction of arrow Y, and thus the cross-section of the cylindrical sheath may be inspected and controlled by the feelers G, supported on the frame 12, at the various levels corresponding to the height of the sheath.

By assuming, that the geared motor Q is stopped at the height that corresponds to the length L', whereby the rectilinearity and co-axiality of cross-section of sheath M corresponding to same length L' are being checked by the feelers G, the operator will read, through the eyepiece 70, the value of such length L', while the dimensional accuracy of related sheath cross-section is indicated by the feelers. When a point spaced not more than 20 or 30 millimeters from the abovestated position is to be inspected, it is not necessary to start the motor 50. Instead inspection is effected by adjusting micrometricaly the slide F by means of the manually operated handwheel 58.

The slide F in its upward motion will reach its upper end stroke position at a height equal to the sheath length.

In the course of the whole upward motion of slide F, the whole outer surface of sheath M is inspected and checked by the feelers G, thereby pointing out whether the machining allowances have been kept within the required tolerances.

Thus, it is possible whether by a permanent recording on diagrams, or not to locate the rectilinearity and co-axially faults of the sheath M.

Obviously, instead of checking all the countless, successive cross-sections of sheath, the operation of feelers may be restricted to a suitable plurality of sections, e.g. 10, 15, 20 or more sections.

When a further check of the possible eccentricity of any cross-section of the element H is to be performed, the platform D can be turned around the axis T—T, by means of the handwheel 22.

Should the geared motor stay frequently in its higher positions, then it might be more convenient for the operator, staying also in a higher position, to operate the switch 64.

It is to be understood that the invention is not limited to the embodiment shown and described, and variations, modifications, changes may be made therein, without departing from the scope of the invention as defined in the appended claims.

What I claim is:
1. An apparatus for inspecting an elongate element having opposite end portions, said apparatus comprising:
 (a) a base;
 (b) a column supported on said base and vertically extending upwardly therefrom;
 (c) a track means vertically disposed on said column and extending parallel thereto;
 (d) a lower seat supported on said base, laterally offset to one side of said column, said lower seat being provided with a vertically disposed recess adapted for vertically receiving one end portion of said elongate element;
 (e) an upper seat provided with a recess adapted for vertically receiving the other end portion of said elongate element;
 (f) first means slidably supporting said upper seat on said track means;
 (g) second means pivotally supporting said upper seat on said first means for permitting the alignment of the recess in said upper seat coaxially with the recess in said lower seat after said elongate element has been seated in said lower seat; and
 (h) measuring means slidably supported on said track means for slidably engaging said elongate element vertically supported by said upper and lower seats for measuring a dimension of said elongate element.

2. An apparatus as claimed in claim 1, including means detachably supporting said upper seat on said second means and said lower seat on said base.

3. An apparatus as claimed in claim 1, wherein said lower seat is rotatably supported on said base and further including means for selectively turning said lower seat and thereby selectively turning said elongate element relative to said measuring means.

4. An apparatus as claimed in claim 1, including means for electro-mechanically adjusting the vertical position of said measuring means along said track means.

5. An apparatus as claimed in claim 4, including means for manually adjusting the vertical position of said measuring means.

6. An apparatus as claimed in claim 1, including a graduated scale supported on said column and reading means slidably supported on said track means cooperating with said scale for defining a particular vertical position on said measuring means.

7. An apparatus as claimed in claim 1, wherein said measuring means includes a finger slidably engaging said elongate element and recording means cooperating with said finger for permanently recording measured dimensional data.

8. An apparatus as claimed in claim 7, wherein said finger includes means for electronically cooperating with said recording means.

9. An apparatus as claimed in claim 7, wherein said finger includes means for pneumatically cooperating with said recording means.

10. An apparatus as claimed in claim 1, wherein said elongate element includes a plurality of longitudinally extending sides, said measuring means including a plurality of fingers corresponding in number to the number of said longitudinally extending sides.

References Cited
UNITED STATES PATENTS

| | | | |
|---|---|---|---|
| 2,358,987 | 9/1944 | MacKay | 33—174 C |
| 2,364,182 | 12/1944 | Ahlstrom | 33—174 L |
| 2,953,856 | 9/1960 | Sharp | 33—147 E |
| 3,264,741 | 8/1966 | Brebant | 33—174 P |
| 3,328,885 | 7/1967 | Frindel | 33—174 P |
| 3,443,317 | 5/1969 | Grahmann | 33—174 P |

SAMUEL S. MATTHEWS, Primary Examiner

U.S. Cl. X.R.

33—147